(12) United States Patent
Zayatz et al.

(10) Patent No.: US 6,617,953 B2
(45) Date of Patent: Sep. 9, 2003

(54) LINK FUSE

(75) Inventors: Robert Zayatz, North Tonawanda, NY (US); Michael D. Brown, Lancaster, NY (US); Timothy R. Ronald, Clarence, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 10/106,463

(22) Filed: Mar. 26, 2002

(65) Prior Publication Data

US 2002/0145501 A1 Oct. 10, 2002

Related U.S. Application Data

(60) Provisional application No. 60/278,809, filed on Mar. 26, 2001.

(51) Int. Cl.[7] .................. H01H 85/08; H01H 85/10; H01M 10/02; H01M 6/02
(52) U.S. Cl. .................. 337/295; 337/159; 337/187; 337/290; 429/7; 429/150
(58) Field of Search .................. 337/295, 290, 337/159, 186, 187, 405; 429/61, 62, 7, 122, 150; 439/250, 366, 622

(56) References Cited

U.S. PATENT DOCUMENTS

| 2,934,627 A | | 4/1960 | Bristol et al. | |
|---|---|---|---|---|
| 2,941,059 A | | 6/1960 | Sims et al. | |
| 3,081,366 A | * | 3/1963 | Belove | 429/58 |
| 3,358,363 A | | 12/1967 | Jacks et al. | |
| 3,361,884 A | | 1/1968 | Parkes | |
| 3,858,142 A | | 12/1974 | Deelman et al. | |
| 3,898,603 A | | 8/1975 | Cricchi et al. | |
| 3,907,588 A | * | 9/1975 | Bergum | 429/7 |
| 4,032,949 A | | 6/1977 | Bierig | |
| 4,140,988 A | | 2/1979 | Oakes | |
| 4,188,460 A | * | 2/1980 | Kang et al. | 429/7 |
| 4,198,744 A | | 4/1980 | Nicolay | |
| 4,261,804 A | | 4/1981 | McGivern, Jr. | |
| 4,272,753 A | | 6/1981 | Nicolay | |
| 4,296,398 A | | 10/1981 | McGalliard | |
| 4,376,927 A | | 3/1983 | McGalliard | |
| 4,379,318 A | | 4/1983 | Ootsuka | |
| 4,394,639 A | | 7/1983 | McGalliard | |
| 4,477,857 A | | 10/1984 | Crocker | |
| 4,652,848 A | | 3/1987 | Hundrieser | |
| 4,742,425 A | | 5/1988 | Conzelmann et al. | |
| 4,862,134 A | | 8/1989 | Poerschke et al. | |
| 4,879,187 A | * | 11/1989 | Biegger | 429/7 |
| 5,120,617 A | * | 6/1992 | Cameron | 429/7 |
| 5,185,219 A | | 2/1993 | Fisher et al. | |
| 5,185,291 A | | 2/1993 | Fischer et al. | |
| 5,196,819 A | | 3/1993 | Roberts | |
| 5,786,240 A | | 7/1998 | Look et al. | |
| 5,815,790 A | | 9/1998 | Billgren et al. | |
| 5,939,217 A | * | 8/1999 | Tamura et al. | 429/7 |
| 5,993,990 A | * | 11/1999 | Kanto et al. | 429/62 |
| 6,205,034 B1 | | 3/2001 | Zayatz | |
| 6,317,335 B1 | | 11/2001 | Zayatz | |

FOREIGN PATENT DOCUMENTS

| DE | 19936279 A1 | * | 2/2000 | H01H/85/055 |
|---|---|---|---|---|
| JP | 04292868 A | * | 10/1992 | H01M/10/39 |

OTHER PUBLICATIONS

Bogaard, R. H. et al., Thermophysical Properties Of Stainless Steels, Themochimica Acta, 218 (1993), 373–393, Elsevier Science Publisher B. V., Amsterdam.

* cited by examiner

Primary Examiner—Anatoly Vortman
(74) Attorney, Agent, or Firm—Michael F. Scalise

(57) ABSTRACT

A power providing device that has a battery, a protective housing a terminal cap and a fuse.

20 Claims, 5 Drawing Sheets

LINK FUSE

CLAIM OF PRIORITY

This application claims the benefit of U.S. patent application No. 60/278,809 filed on Mar. 26, 2001.

BACKGROUND INFORMATION

The invention relates generally to fuses.

BRIEF DESCRIPTION OF THE DRAWINGS

For a fuller understanding of the nature and objects of the invention, reference should be made to the following detailed description taken in conjunction with the accompanying drawings, in which.

DETAILED DESCRIPTION

Figure 1:
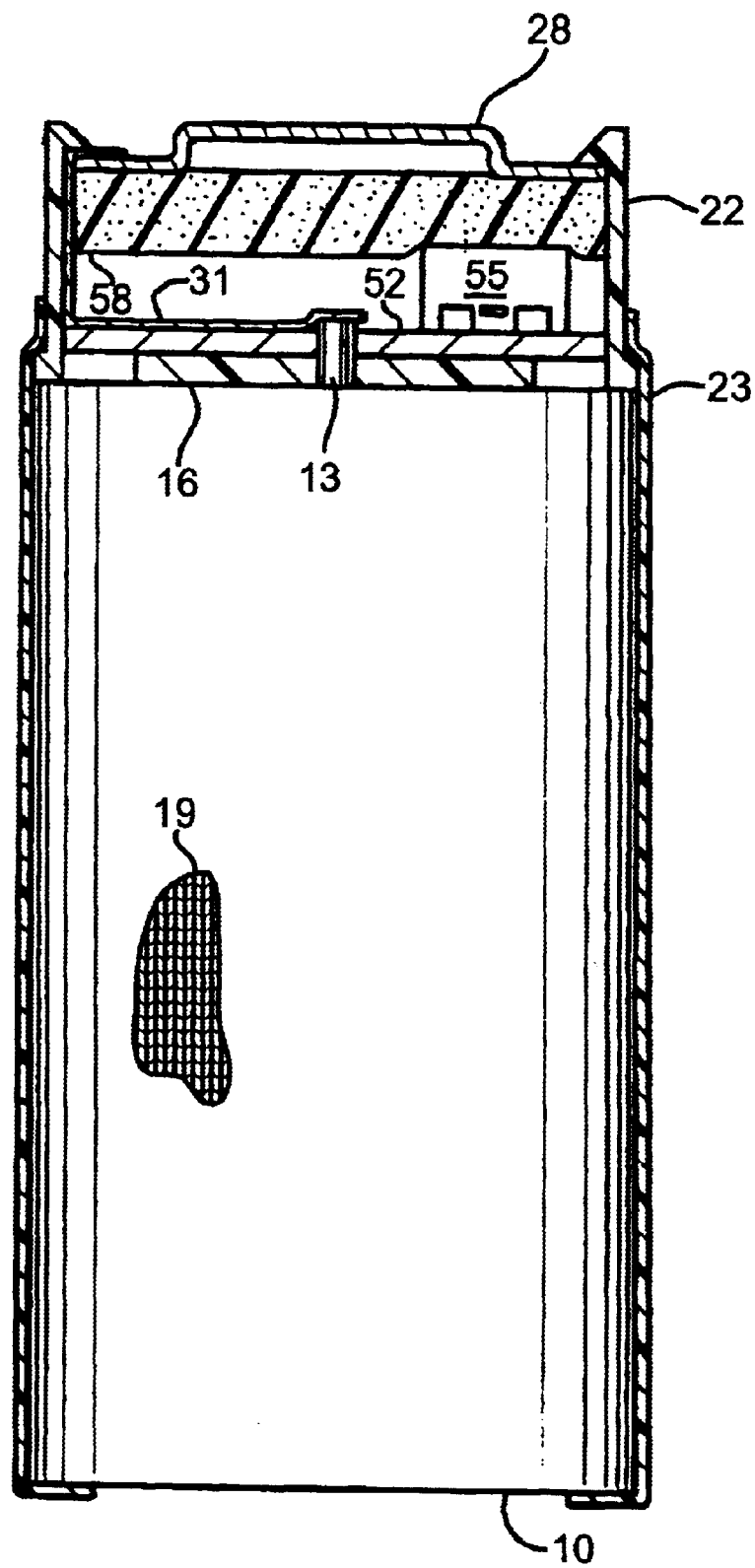
FIG. 1 is a partially cross sectioned side view of a device in accordance with one embodiment of the invention.

The present invention is a power providing device. FIG. 1 shows an embodiment of the invention that includes a battery 10 having an electrically conductive terminal pin 13 extending from a header 16. The battery 10 may include an electrode 19 having lithium. The battery 10 may be a primary (non-rechargeable) battery, or may be a secondary battery (rechargeable).

Figure 2:
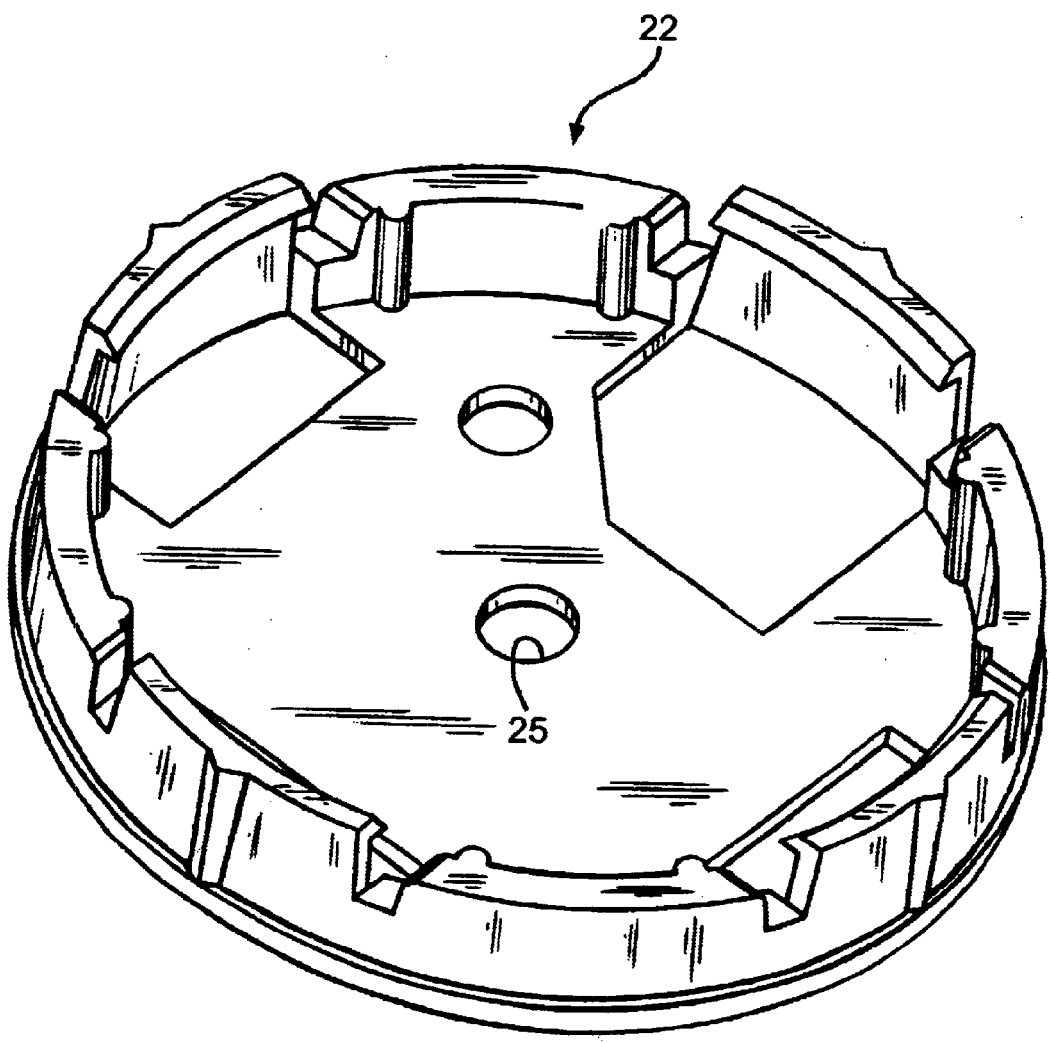
FIG. 2 is a perspective view of a housing in accordance with one embodiment of the invention.
Figure 3:
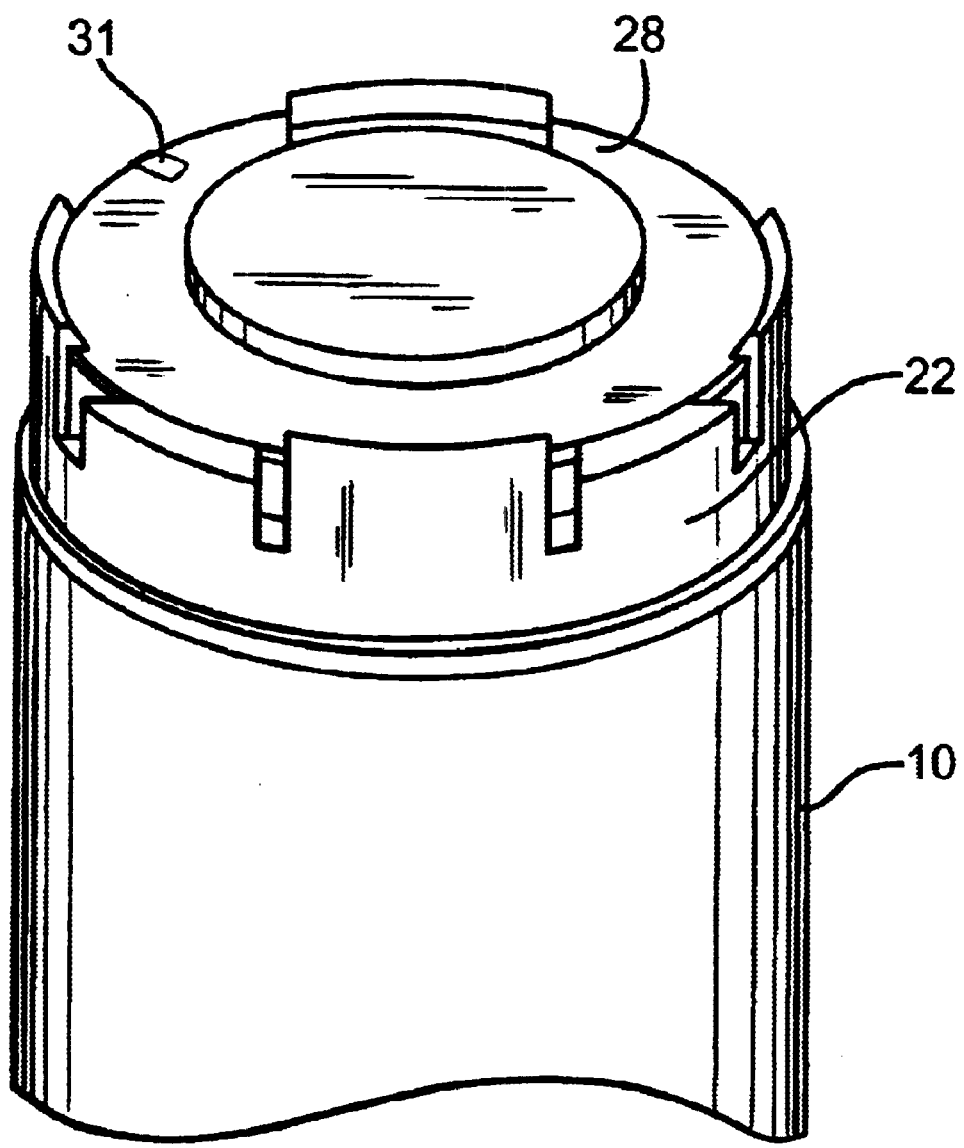
FIG. 3 is a perspective view of a device in accordance with one embodiment of the invention.

FIGS. 1–3 show a protective housing 22 that may be attached to the battery 10. The protective housing may be attached to the battery by shrink wrap 23. The protective housing may be made from a material that is electrically insulative. The protective housing 22 may have an orifice 25 within which the terminal pin 13 may reside. An electrically conductive terminal cap 28 may be attached to the housing 22.

FIGS. 1, 3, 4A, 4B, 5, 6A and 6B show a fuse 31 that may be welded to the terminal pin 13 and the terminal cap 28, for example by resistance welding. The fuse 31 is electrically conductive, and may be made from stainless steel, such as 302 series or 304 series stainless steel. The fuse 31 may also be made from nickel, or an alloy of nickel, such as nickel and silver.

The fuse 31 may be a single piece of metal having a first welding end 34, a fuse element portion 37 and a second welding end 40. In this embodiment, the customary glass enclosure found in many fuses is not present. The first welding end 34 may be welded to the terminal pin 13, and the second welding end 40 may be welded to the terminal cap 28. A first end 43 of the fuse element portion 37 may be joined to the first welding end 34, and a second end 46 of the fuse element portion 37 may be joined to the second welding end 40.

Figure 4A:
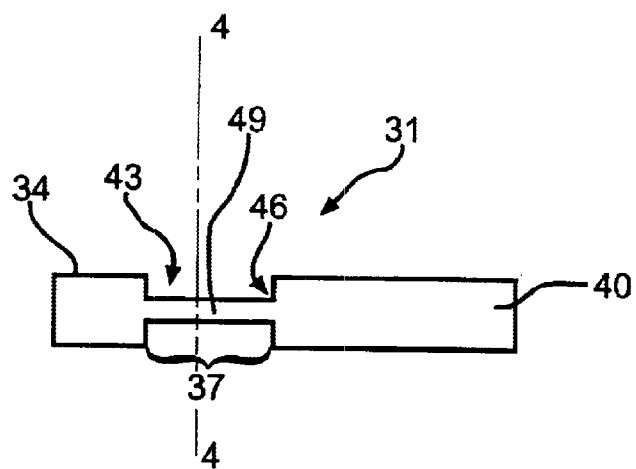
FIG. 4A shows a fuse in accordance with one embodiment of the invention.
Figure 4B:
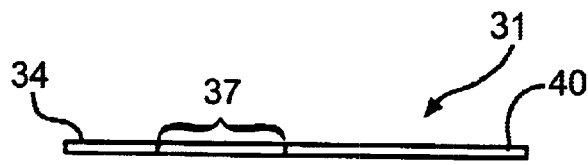
FIG. 4B is a side view of the fuse shown in FIG. 4A.
Figure 5:
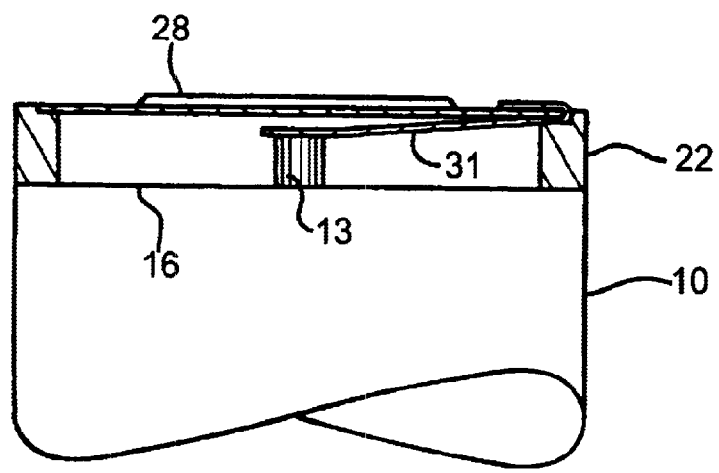
FIG. 5 is a partially cross sectioned side view of a device in accordance with one embodiment of the invention.

As shown in FIGS. 4A and 4B, the fuse 31 may be shaped so the fuse element portion 37 provides a narrower conductive path than either of the welding ends 34, 40. An external surface 49 of the fuse element portion 37 may be photo-etched to provide a precisely dimensioned conductive path. By precisely dimensioning the fuse element portion 37, the fuse element portion 37 will be more likely to separate at the desired current limit. In one embodiment of the invention, a cross sectional area (indicated by the line 4—4) of the fuse element portion 37 taken perpendicular to the flow of current is between about 0.0903 and 0.0913 square inches. In this manner, the current which will cause the fuse element portion 37 to separate may be in the range of about 5 to 20 amps.

Figure 6A:
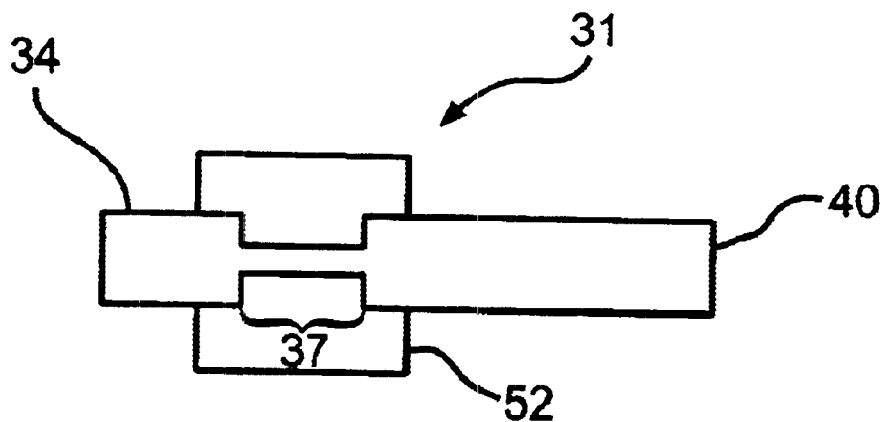
FIG. 6A shows a fuse and substrate in accordance with one embodiment of the invention.
Figure 6B:
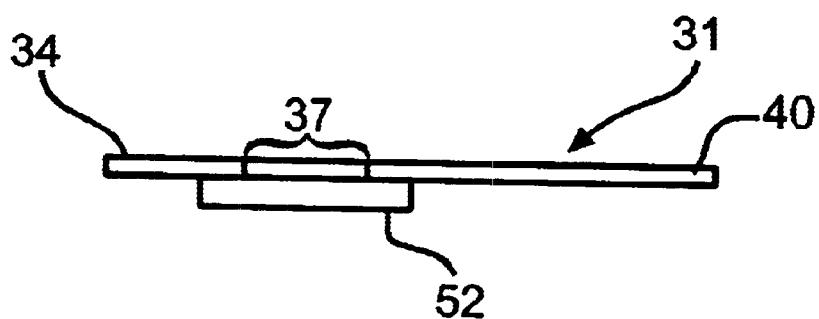
FIG. 6B is a side view of the fuse and substrate shown in FIG. 6A.

In an embodiment of the invention, the fuse 31 may be mounted on a substrate 52. FIG. 1 shows a fuse 31 and an electrical device 55 mounted on a substrate 52. FIGS. 6A and 6B show a different embodiment in which the fuse element portion 37 is mounted on a substrate 52, but the electrical device 55 is not. The fuse element portion 37 may be mounted on the substrate by using solder to join the fuse to the substrate.

The substrate 52 may reside between the terminal cap 28 and the battery 10. The substrate 52 may also reside between the terminal cap 28 and the housing 22.

The substrate 52 may be made from a polyamide material, polytetraflouroethylene, a ceramic material a glass reinforced hydrocarbon/ceramic laminate, or a combination of one or more of these materials. Examples of glass reinforced hydrocarbon/ceramic laminates include those made by Rogers Corporation of Chandler, Ariz. and marketed under the trademark RO4000® Series.

A compressible pad 58 may be included to firmly hold the substrate 52 within the housing 22. As shown in FIG. 1, the compressible pad 58 may contact the electrical device 55 in order to hold the substrate 52. However, it should be noted that the compressible pad 58 may also contact the substrate 52.

Although the invention has been described with respect to one or more particular embodiments, it will be understood that other embodiments of the invention may be made without departing from the spirit and scope of the invention.

What is claimed is:

1. A power providing device, comprising:
    a battery having a terminal pin extending from a header;
    a protective housing attached to the battery, the protective housing having an orifice, the terminal pin residing in the orifice;
    a terminal cap attached to the housing; and
    a fuse welded to the terminal pin and to the terminal cap.

2. The power providing device of claim 1, wherein the fuse includes stainless steel.

3. The power providing device of claim 2, wherein the stainless steel is a 302-series stainless steel.

4. The power providing device of claim 2, wherein the stainless steel is a 304-series stainless steel.

5. The power providing device of claim 1, wherein the fuse includes nickel.

6. The power providing device of claim 1, wherein the fuse includes a nickel and silver alloy.

7. The power providing device of claim 1, wherein the fuse has a cross-sectional area of between about 0.0903 and 0.0913 square inches.

8. The power providing device of claim 1, wherein the battery includes an electrode having lithium.

9. The power providing device of claim 1, wherein the fuse will separate at less than about 20 amps of electric current.

10. The power providing device of claim 1, wherein the fuse includes a fuse element portion providing a narrower conductive path than either of two ends of the fuse, one of such ends being welded to the terminal cap and the other of such ends being welded to the terminal pin.

11. The power providing device of claim 10, wherein a surface of the fuse element portion has been photo-etched.

12. The power providing device of claim 1, wherein the fuse consists of a single piece of metal having a first welding end welded to the terminal pin, a fuse element portion joined to the first welding end, and a second welding end joined to the fuse element portion and welded to the terminal cap.

13. The power providing device of claim 12, wherein a surface of the fuse element portion has been photo-etched.

14. The power providing device of claim 1, further comprising a substrate on which the fuse element portion is mounted.

15. The power providing device of claim 14, wherein the substrate resides between the terminal cap and the battery.

16. The power providing device of claim 14, wherein the substrate resides between the terminal cap and the housing.

17. The power providing device of claim 14, wherein the substrate includes a ceramic material.

18. The power providing device of claim 14, wherein the substrate includes a polyamide material.

19. The power providing device of claim 14, wherein the substrate includes polytetraflouroethylene.

20. The power providing device of claim 14, wherein the substrate includes glass reinforced hydrocarbon/ceramic laminate.

* * * * *